United States Patent
Subramaniam et al.

(10) Patent No.: US 12,234,329 B2
(45) Date of Patent: Feb. 25, 2025

(54) METHODS FOR FORMING LIGNIN PREPOLYMERS AND LIGNIN RESINS

(71) Applicant: University of Kansas, Lawrence, KS (US)

(72) Inventors: Bala Subramaniam, Lawrence, KS (US); Julian R. Silverman, Nyack, NY (US); Andrew M. Danby, East Yorkshire (GB); Thomas Binder, Marion, IA (US); Steffan Green, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 643 days.

(21) Appl. No.: 17/554,056

(22) Filed: Dec. 17, 2021

(65) Prior Publication Data

US 2022/0112339 A1   Apr. 14, 2022

Related U.S. Application Data

(63) Continuation-in-part of application No. PCT/US2020/038667, filed on Jun. 19, 2020.

(60) Provisional application No. 63/209,539, filed on Jun. 11, 2021, provisional application No. 62/864,741, filed on Jun. 21, 2019, provisional application No. 62/863,987, filed on Jun. 20, 2019.

(51) Int. Cl.
    *C08J 3/00* (2006.01)

(52) U.S. Cl.
    CPC ............. *C08J 3/00* (2013.01); *C08J 2397/00* (2013.01)

(58) Field of Classification Search
    None
    See application file for complete search history.

(56) References Cited

U.S. PATENT DOCUMENTS

| | | |
|---|---|---|
| 5,010,156 A | 4/1991 | Cook et al. |
| 5,074,960 A | 12/1991 | Nimz et al. |
| 5,102,992 A | 4/1992 | Glasser et al. |
| 5,385,641 A | 1/1995 | Berg et al. |
| 7,074,306 B2 | 7/2006 | Martelli et al. |
| 8,992,688 B2 | 3/2015 | Shevchenko et al. |
| 10,745,335 B2 | 8/2020 | Subramaniam et al. |

(Continued)

FOREIGN PATENT DOCUMENTS

| | | |
|---|---|---|
| EP | 0200479 A2 | 4/1986 |
| WO | WO 2012/075053 A2 | 6/2012 |
| WO | WO 2015/021541 A1 | 2/2015 |
| WO | WO 2018/013796 A1 | 1/2018 |
| WO | WO 2018/219954 A1 | 12/2018 |

OTHER PUBLICATIONS

Silverman et al ACS Sustainable Chem. Eng. 2020, 8, 17001-17007 (Year: 2020).*

(Continued)

*Primary Examiner* — Mark S Kaucher
(74) *Attorney, Agent, or Firm* — Bell & Manning, LLC (57) ABSTRACT

Methods of forming lignin prepolymers are provided. In an embodiment, such a method comprises adding an acid to an ozonized reaction mixture, the ozonized reaction mixture comprising ozonized lignin having a backbone, and aromatic monomers cleaved from a lignin, under conditions to react the cleaved aromatic monomers with the backbone of the ozonized lignin to form a lignin prepolymer. The methods may further comprise using the lignin prepolymer to form a lignin resin.

19 Claims, 9 Drawing Sheets

(56) References Cited

U.S. PATENT DOCUMENTS

| | | |
|---|---|---|
| 2004/0167019 A1 | 8/2004 | Liang et al. |
| 2010/0159521 A1 | 6/2010 | Cirakovic |
| 2010/0159522 A1 | 6/2010 | Cirakovic |
| 2010/0160823 A1 | 6/2010 | Parihar et al. |
| 2012/0107886 A1 | 5/2012 | Albizati et al. |
| 2012/0187228 A1 | 7/2012 | Camp et al. |
| 2014/0034508 A1 | 2/2014 | Stecker et al. |
| 2014/0046099 A1 | 2/2014 | Stecker et al. |
| 2014/0234947 A1 | 8/2014 | Jones |
| 2015/0099868 A1 | 4/2015 | Yang et al. |
| 2015/0247009 A1 | 9/2015 | Mitchell |

OTHER PUBLICATIONS

The International Search Report and the Written Opinion issued on Sep. 21, 2020 for international application No. PCT/US20/38667; pp. 1-16.

The International Search Report & Written Opinion issued in international application No. PCT/US2017/41910 dated Sep. 28, 2017, pp. 1-6.

Quesada et al., "Chemical Characterization of Ozonated Lignin Solutions from Corn (*Zea mays*) Stalk and Poplar (*Populus deltoides*) Wood by Capillary Gas Chromatography," *J. High Resol. Chromatogr.*, vol. 20, Oct. 1997, pp. 565-568.

Quesada et al., "Ozonation Products of Organosolvolytic Extracts from Vegetal Materials," *J. Agric. Food Chem.*, vol. 46, No. 2, 1998, pp. 692-697.

Rodger M. Dorland, A Thesis: "The Ozonization and Structure of Lignin in Relation to Solubility in Bisulphite Solutions," McGill University, Apr. 1939, pp. 1-182.

Daphne Hermosilla et al., "The Application of Advanced Oxidation Technologies to the Treatment of Effluents from the Pulp and Paper Industry: A Review," 22 *Environmental Science and Pollution Research* 168 (2015).

Rodolfo Travaini et al., "Ozonolysis: An Advantageous Pretreatment for Lignocellulosic Biomass Revised," 199 *Bioresource Technology* (2016).

* cited by examiner

METHODS FOR FORMING LIGNIN PREPOLYMERS AND LIGNIN RESINS

CROSS-REFERENCE TO RELATED APPLICATIONS

The present application is a continuation-in-part of International patent application number PCT/US20/38667, which was filed on Jun. 19, 2020 and which claims priority to U.S. provisional patent application No. 62/863,987 that was filed Jun. 20, 2019 and to U.S. provisional patent application No. 62/864,741 that was filed Jun. 21, 2019, the entire contents of each of which are incorporated herein by reference. The present application also claims priority to U.S. provisional patent application No. 63/209,539 that was filed on Jun. 11, 2021, the entire contents of which are incorporated herein by reference.

REFERENCE TO GOVERNMENT RIGHTS

This invention was made with government support under 1539105 and 1919267 awarded by the National Science Foundation. The government has certain rights in the invention.

BACKGROUND

Lignins are the most abundant source of renewable aromatics and a viable candidate for replacing synthetic reagents and additives in polymers. They are chemically and structurally complex, and there are many possible routes to transform them into components and precursors for making advanced materials. Significant amounts of lignins are produced as byproducts from the pulp and paper industries as well as cellulosic ethanol biorefineries. Their diversity is further complicated by different methods of extraction and include lignosulfonates, milled lignins, kraft and alkaline lignins, and organosolv lignins. Simple and practical technologies to make value-added chemicals and material precursors are essential for the economic viability of biorefineries.

Phenolation, or the electrophilic aromatic substitution and condensation of phenol and hydrocarbons, is typically performed on lignin to increase the number of reactive sites by adding the aromatic ring to the lignin propyl side chain, thereby increasing its predilection for polymerization. The products that result from grafting single aromatics onto aromatic polymers serve as a prepolymer reagent in the synthesis of epoxies, phenol-formaldehyde or Bakelite-style resins, and other polymers. While phenolation serves to increase the number of sites capable of reacting with a second monomer (e.g., formaldehyde or hydroxymethylfurfural), the use of petroleum-derived phenol reduces the renewable fraction in the products.

SUMMARY

Provided herein are methods for forming lignin prepolymers. Methods for forming lignin resins from the lignin prepolymers are also provided.

In embodiments, a method for forming a lignin prepolymer comprises adding an acid to an ozonized reaction mixture, the ozonized reaction mixture comprising ozonized lignin having a backbone, and aromatic monomers cleaved from a lignin, under conditions to react the cleaved aromatic monomers with the backbone of the ozonized lignin to form a lignin prepolymer. The method may further comprise using the lignin prepolymer to form a lignin resin.

Also provided is a method of forming an ozonized reaction mixture, the method comprising flowing a lignin composition comprising corn cob lignin and a solvent through a reaction chamber and flowing ozone through the reaction chamber to form an ozonized reaction mixture comprising ozonized corn cob lignin and aromatic monomers cleaved from the corn cob lignin.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 1A shows a reaction scheme; 'L' denotes a bond to lignin. FIG. 1B shows sequential process steps to make prepolymer in one pot. An ozone-pretreated mixture may be fractionated by solvent extraction into low (LLE) and high molecular weight (HLS) fractions. The LLE fraction is grafted onto the HLS fraction using an acid catalyst to afford phenolic prepolymers (LPP), which can be used to form phenol-formaldehyde Novolac-type resins (LNR).

DETAILED DESCRIPTION

The following abbreviations may be used throughout this disclosure: 4HB: 4-hydroxybenzaldehyde; ADM: Archer Daniels Midland Company; Da: Dalton; DMSO: dimethylsulfoxide; GC: gas chromatography; GPC: gel permeation chromatography; HSQC NMR: heteronuclear single quantum correlation nuclear magnetic resonance spectroscopy; HMW: high molecular weight; HLS: high molecular weight ozonized lignin solids; kDa: kilodalton; LLE: low molecular weight ozonized lignin extract; LMW: low molecular weight; LNR: lignin 'novolac' resin; LPP: grafted ozonized lignin prepolymer; OZL: ozonized lignin; SEM: scanning electron microscopy; TCI: TCI Chemicals America.

Provided herein are methods for forming lignin prepolymers. Methods for forming lignin resins from the lignin prepolymers are also provided. Advantageous features of the present methods include one or more of the following: lignin prepolymers may be formed from an ozonized reaction mixture in a single pot (i.e., reaction chamber), which may also be used to carry out ozonolysis to form the ozonized reaction mixture and/or to further convert the lignin prepolymers to the lignin resin; no petroleum-derived phenol monomers are required to form the lignin resin; and high conversion of starting lignin to lignin prepolymer may be achieved.

Figure 1A:
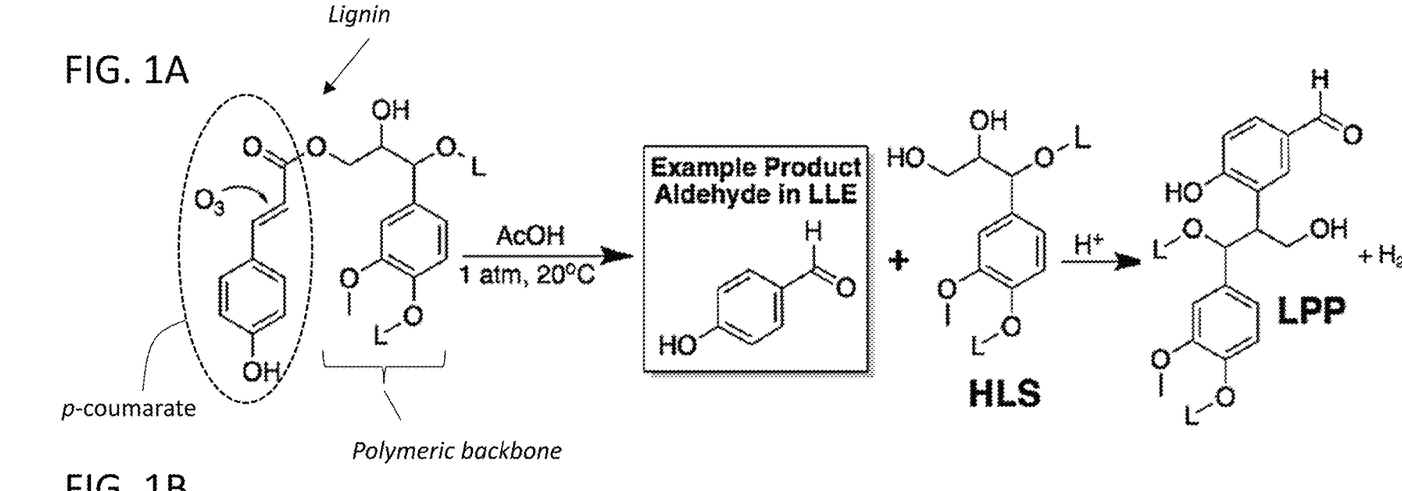
FIGS. 1A-1B show an ozonolysis-acidification strategy to form prepolymer from grass lignin according to an illustrative embodiment.

In one aspect, a method of forming a lignin prepolymer is provided. In embodiments, such a method comprises adding an acid to an ozonized reaction mixture comprising ozonized lignin having a backbone and aromatic monomers which have been cleaved from lignin due to ozonolysis. As shown in FIG. 1A, lignin is a natural polymer comprising aromatic groups (e.g., p-coumarate groups) covalently bound to a backbone. As further discussed below, lignin may be exposed to ozone under conditions which oxidatively cleave these aromatic groups from the backbone, providing the cleaved aromatic groups and the remaining backbone (i.e., ozonized lignin). In particular, the olefinic bond attaching the p-coumarate groups to the backbone is particularly susceptible to ozone attack.

Figure 4:
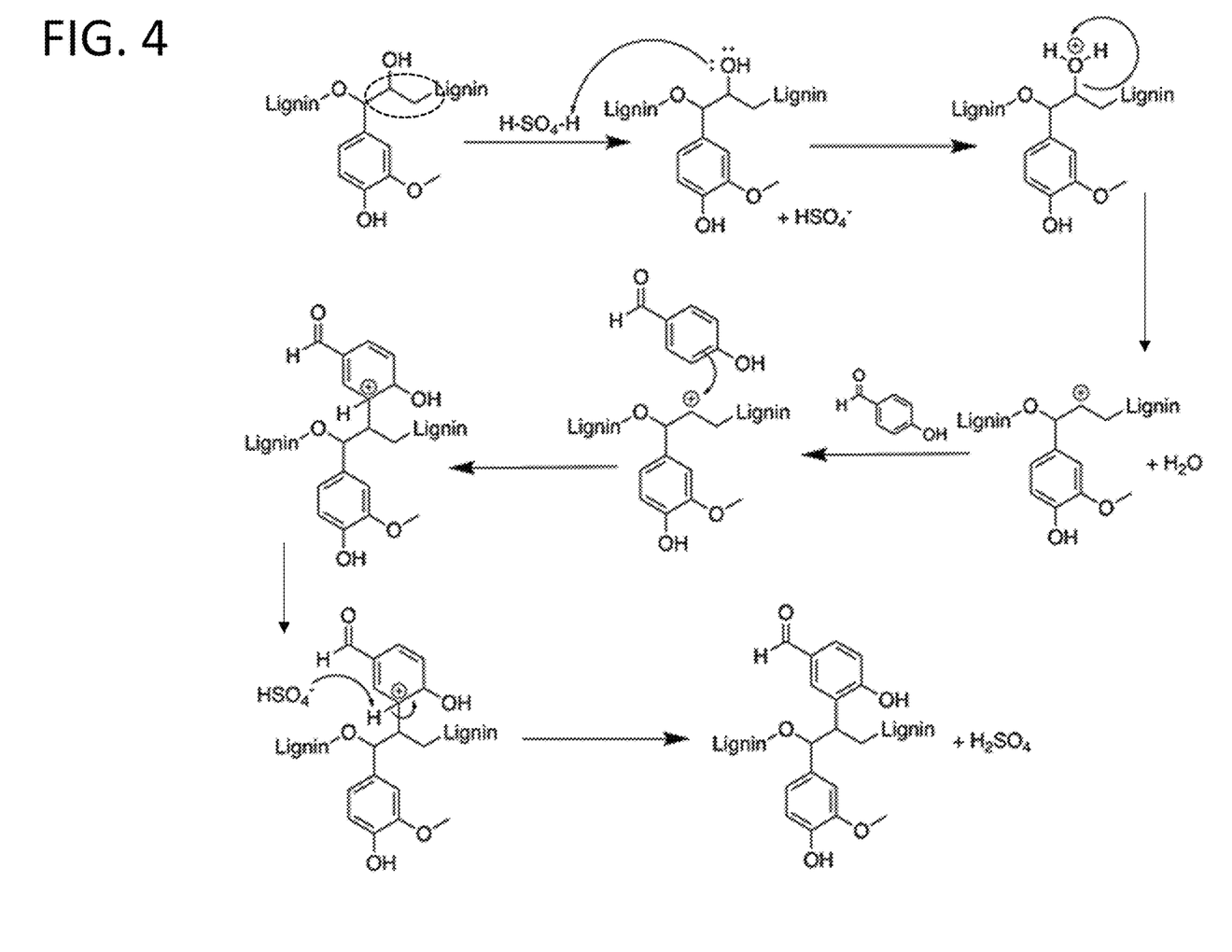
FIG. 4 shows a mechanism for the grafting of aromatics onto lignin: the electrophilic aromatic substitution of 4-hydroxybenzaldehyde at the β-position on the propyl side chain of lignin (dashed circle).

In the present methods, the acid is added to the ozonized reaction mixture under conditions to react the cleaved aromatic monomers with the backbone of ozonized lignin to form a lignin prepolymer. As illustrated in FIG. 4, the backbone comprises propyl side chains (dashed circle) onto which the cleaved aromatic monomers may attach in the presence of the acid. Thus, the present methods involve grafting aromatic monomers which have been previously cleaved from lignin back onto a backbone of ozonized lignin. The result is a lignin prepolymer. In the present disclosure, the lignin prepolymer may be referred to as "grafted ozonized lignin prepolymer" (LLP). As described further below, this lignin prepolymer generally has different properties as compared to the lignin(s) from which the components of the ozonized reaction mixture were derived.

The acid used in the present methods is a strong acid. The phrase "strong acid" refers to an acid having a $pK_a$ of less than −2 in water. Illustrative acids include sulfuric acid ($H_2SO_4$), nitric acid ($HNO_3$), hydrochloric acid (HCl), and perchlorate ($HClO_4$). Amounts of acid in a range of from 0.001% to 0.01% by weight as compared to the weight of the ozonized lignin may be used.

By "conditions," as that term is used with respect to the present methods, can refer to the atmosphere, the temperature, and the time over which the ozonized reaction mixture is in contact with the acid. These conditions may be adjusted to facilitate the grafting reactions. However, generally, ambient conditions may be used, i.e., the addition of acid may occur in air, under atmospheric pressure, and room temperature (about 20 to 25° C.). The time may be in a range of from 10 minutes to 60 minutes. The ozonized reaction mixture may be stirred during and after adding the acid.

Figure 1B:
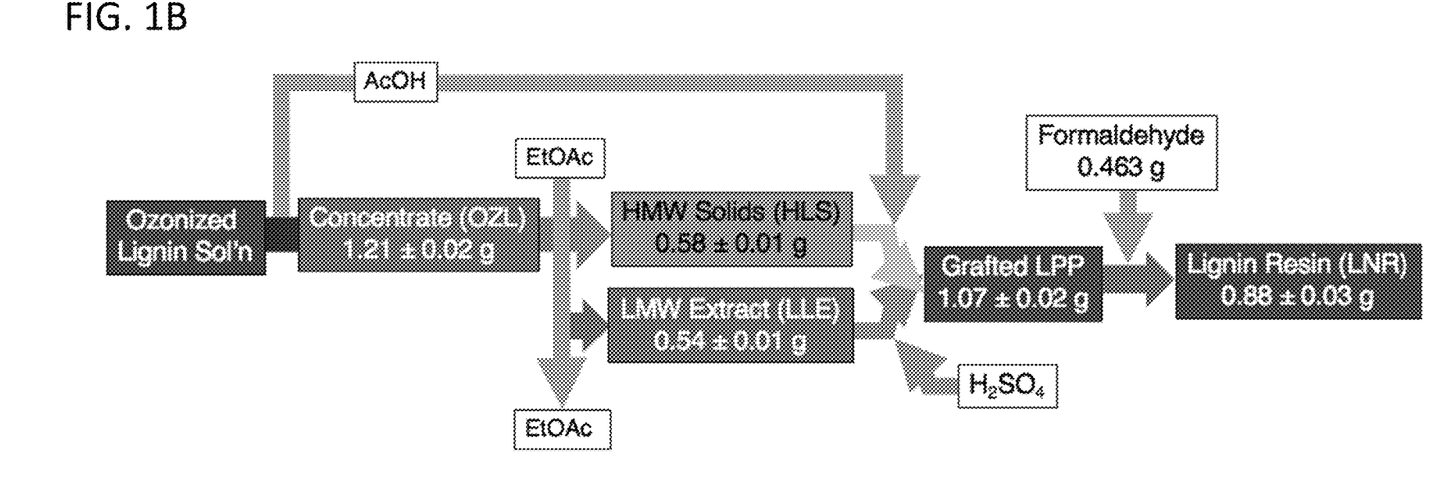

In embodiments, the cleaved aromatic monomers and the ozonized lignin originate from the same starting lignin. (In the present disclosure, the lignin to be ozonized, but in a form prior to ozonolysis, may be referred to as the "starting lignin.") That is, a starting lignin may be ozonized to form both these components of the ozonized reaction mixture. In such embodiments, the cleaved aromatic monomers are relatively low molecular weight species making up a portion of the ozonized reaction mixture. In the present disclosure, this first portion may be referred to as a "low molecular weight ozonized lignin extract" (LLE). The remaining backbone (i.e., the ozonized lignin) makes up another, relatively higher molecular weight, portion of the ozonized reaction mixture. In the present disclosure, this second portion may be referred to as "high molecular weight ozonized lignin solids" (HLS). As shown in FIG. 1B, the first and second portions may be separated from the ozonized reaction mixture prior to adding the acid. However, such separation is not necessary.

In other embodiments, the cleaved aromatic monomers mixture and the ozonized lignin originate from different starting lignins. By way of illustration, the cleaved aromatic monomers may originate from the ozonolysis of herbaceous lignin having many p-coumarate groups while the ozonized lignin may originate from the ozonolysis of woody lignin having relatively fewer p-coumarate groups. Whether the cleaved aromatic monomers and the ozonized lignin originate from the same or different starting lignins, the cleaved aromatic monomers may be referred to as "endogenous aromatic monomers" as they originate from a lignin source, as opposed to a non-lignin source, such as petroleum. By contrast, aromatic monomers originating from a non-lignin source, such as petroleum-derived phenols, may be referred to as "exogenous aromatic monomers." Although the present methods can make use of such exogenous aromatic monomers, in embodiments, no such exogenous aromatic monomers are used and the lignin prepolymer does not comprise any grafted exogeneous aromatic monomers. Thus, at least embodiments of the present methods are more efficient, less costly, and more environmentally friendly than existing methods.

In still other embodiments, the cleaved aromatic monomers and the ozonized lignin can originate from the same starting lignin but cleaved aromatic monomers from a different starting lignin and/or an ozonized lignin from a different starting lignin may be included in the ozonized reaction mixture or added to the ozonized reaction mixture during the present methods.

In general, any aromatic monomers cleaved from lignin during ozonolysis may be grafted back onto a backbone of ozonized lignin. Illustrative aromatic monomers include vanillin, 4-hydroxybenzaldehyde, hydroquinone, vanillic acid, and 4-hydroxybenzoic acid. In embodiments, the aromatic monomers are selected from vanillin, 4-hydroxybenzaldehyde, vanillic acid, 4-hydroxybenzoic acid, and combinations thereof. The phrase "selected from" is used to indicate that no other aromatic monomers are grafted other than combinations of the named aromatic monomers and that other unnamed aromatic monomers, if grafted, are only grafted at trace amounts. Control over the type of aromatic monomer available to be grafted may be achieved by using certain ozonolysis techniques, including the technique described below.

The lignin which is ozonized may be characterized by the natural source from which the lignin is extracted. A variety of natural sources of biomass may be used to generate lignin. The biomass may include agricultural waste, agricultural product, forestry waste or forestry product. The biomass may include herbaceous plants, plants that have no persistent wood stem above ground. Illustrative types of herbaceous biomass include corn stover and wheat straw. Corn cobs (distinct from corn stover) are another illustrative type of herbaceous biomass. Other types of lignin, including non-herbaceous lignin (e.g., woody lignin) may be used. As noted above, the different types of lignin may have different amounts of p-coumarate groups, e.g., lignin from herbaceous biomass generally has more p-coumarate groups as compared to lignin from woody biomass. Combinations of different types of lignins may be used so as to form hybrid lignin prepolymers (and hybrid lignin polymers therefrom) having unique properties.

The lignin may also be characterized by the procedure used to extract the lignin. Lignin may be extracted from biomass using several techniques, including organosolv, steam explosion, dilute acid hydrolysis, alkali extraction and wet oxidation procedures. Organosolv procedures refer to the use of an aqueous organic solvent to extract the lignin from the natural source. In the present disclosure, lignin extracted via organosolv procedures using acetic acid as the aqueous organic solvent may be referred to as "acetosolv lignin."

Different techniques may be used for the ozonolysis of lignin, but the techniques described in International Patent Publication No. WO2018013796, which is hereby incorporated by reference in its entirety, are particularly useful. These techniques enable maximizing the oxidative cleavage of certain aromatic groups of lignin (e.g., p-coumarate groups) while minimizing oxidative cleavage of the backbone. They are also capable of achieving high yields of the aromatic monomers described below. Briefly, these techniques involve flowing ozone through a reaction chamber (e.g., a reaction chamber of a continuous flow reactor) containing the lignin. The lignin may be provided as a lignin composition comprising the lignin and a solvent (e.g., a short chain carboxylic acid such as acetic acid). Water may be included in the lignin composition. The lignin/lignin composition may also be provided as a flowing stream during ozonolysis. Illustrative continuous flow reactors, lignin compositions, and conditions for carrying out the ozonolysis are provided in International Patent Publication No. WO2018013796, which is hereby incorporated by reference in its entirety. In embodiments, the ozonized reaction mixture used in the present methods is one formed using these techniques, i.e., by flowing a lignin composition comprising a starting lignin and a solvent through a reaction chamber and flowing ozone through the reaction chamber.

In embodiments, the present methods further comprise forming the ozonized reaction mixture (prior to adding the acid) as described above. In this way, both the ozonolysis/cleaving and the grafting may be carried out in the single pot as noted above. However, this is not necessary, as the ozonized reaction mixture may be independently generated, e.g., using different equipment, a different facility, etc. If the ozonized reaction mixture is independently generated, it may be recovered and, if desired, dissolved/suspended in a solvent prior to carrying out the present methods. In either case, the present methods do not require separating (e.g., extracting, fractionating, etc.) the ozonized lignin having the backbone from the cleaved aromatic monomer(s). In other words, the present methods do not require separating the first portion comprising the cleaved aromatic monomer(s) from the second portion comprising the ozonized lignin. However, in embodiments, such separation is useful, e.g., to achieve an ozonized reaction mixture comprising cleaved aromatic monomers originating from one type of lignin and ozonized lignin from another type of lignin. If such separation occurs, the ozonized reaction mixture may be formed by combining the portions at desired amounts in a suitable solvent.

The ozonized reaction mixture to be acidified by the present method may comprise other components in addition to the ozonized lignin and the cleaved aromatic monomer(s). For example, the ozonized reaction mixture may comprise a solvent and optionally, water, as described above. In embodiments, the ozonized reaction mixture consists of the ozonized lignin having the backbone, the cleaved aromatic monomer(s), optionally, the solvent, and optionally, the water. However, such an ozonized reaction mixture encompasses any impurities inherently present in the starting lignin used to form the ozonized reaction mixture.

The amount of the cleaved aromatic monomers in the ozonized reaction mixture may be in a range of from 0.1% to 15% by weight. ("By weight" refers to the weight of the aromatic monomers as compared to the weight of the starting lignin itself (in dry form and not the lignin composition) used to provide the cleaved aromatic monomers.) This includes a range of from 1% to 15% by weight and from 5% to 15% by weight. These weights may refer to an individual aromatic monomer or the total amount of aromatic monomers. The amount of the ozonized lignin having the backbone in the ozonized reaction mixture may be in a range of from 85% to 99.9% by weight. (Again, "by weight" refers to the weight of the ozonized lignin as compared to the weight of the starting lignin itself.) This includes a range of from 90% to 99% by weight and from 90% to 95% weight. The high amounts of aromatic monomer and ozonized lignin as compared to the respective starting lignins (i.e., high conversion) may be achieved by using the ozonolysis technique described above. In addition, as noted above, this technique is able to minimize/prevent oxidative cleavage of olefinic bonds, leaving the backbone of the ozonized lignin otherwise intact.

The present methods may be characterized by a high conversion of a starting lignin to lignin prepolymer. As previously noted, the ozonolysis technique described above is capable of converting most or all of a starting lignin to cleaved aromatic monomer(s) and ozonized lignin. As described in the Example, below, GPC analysis may be conducted on a filtrate obtained after acidifying an ozonized reaction mixture formed using this ozonolysis technique and recovering the lignin prepolymer to confirm that the filtrate has little or none of the first portion (the LLE containing the cleaved aromatic monomer(s)) or the second portion (the HLS containing the ozonized lignin). In embodiments, this GPC analysis shows that at least 80%, at least 85%, at least 90%, at least 95%, or at least 98% of the starting lignin is converted to the lignin prepolymer. Such high conversions further demonstrate the efficiency of the present methods.

After the lignin prepolymer has been formed by the present methods, it may be recovered from the acidified ozonized reaction mixture. Various techniques may be used to recover the lignin prepolymer, including dilution and precipitation as described in the Example, below.

The lignin prepolymer formed using the present methods may be characterized by various properties, including polydispersity. The lignin prepolymer may be characterized by a polydispersity index (PDI) of no more than 2.00, no more than 1.90, no more than 1.89, or no more than 1.88, no more than 1.87, or no more than 1.86. PDI values may be determined using the techniques described in the method below. The narrowness of the molecular weight distribution indicated by these PDI values further demonstrates complete grafting of the cleaved aromatic monomers onto the backbone of the ozonized lignin. These PDI values also show that the lignin prepolymer is monodisperse as compared to the starting lignin (e.g., PDI of grass lignin is 2.46).

Figure 6:
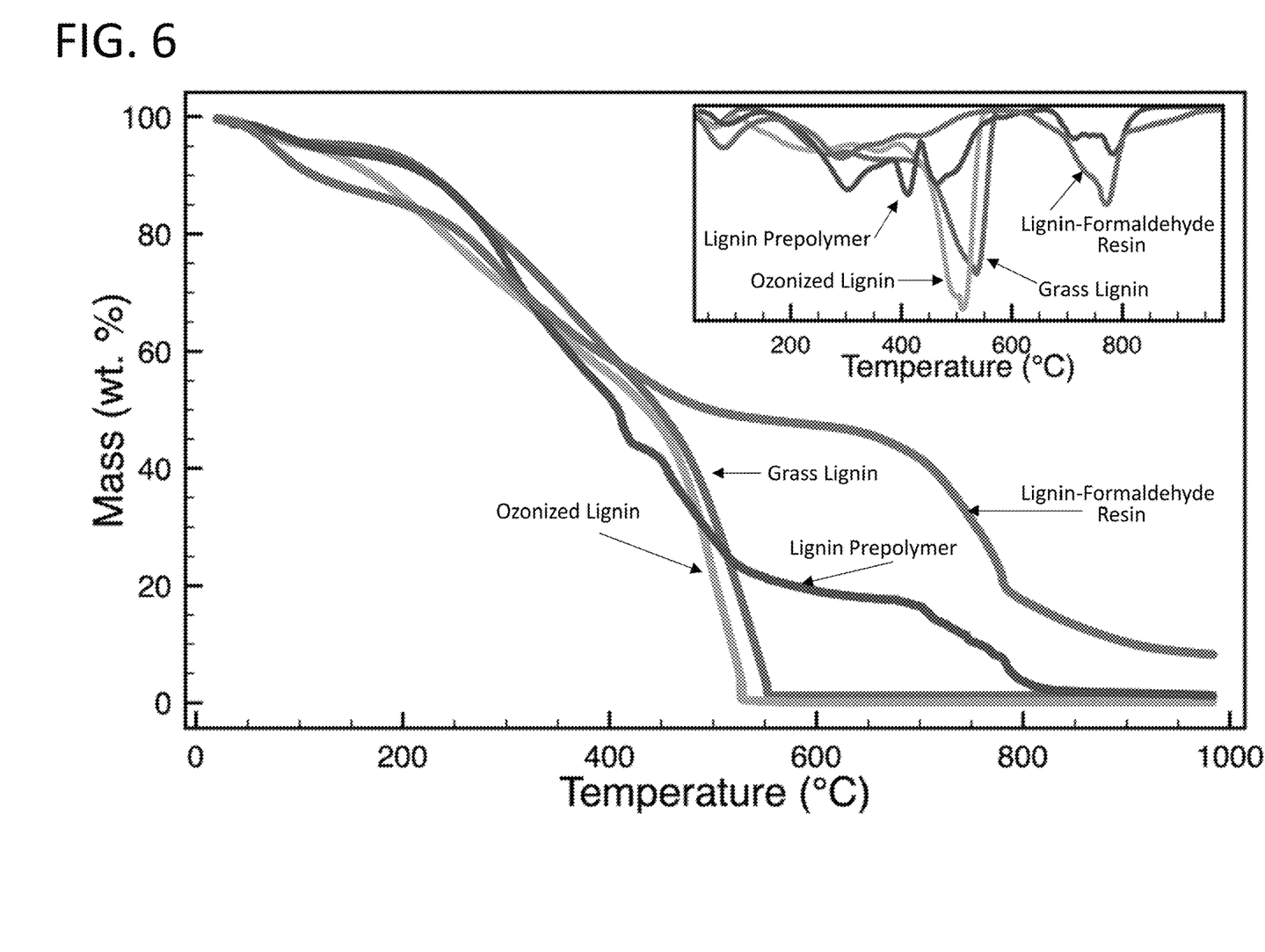
FIG. 6 shows thermogravimetric analyses of unprocessed lignin, ozonized lignin (OZL), LPP, and LPP-derived resin (LNR) in air. The inset shows the first derivative of the curves with peaks demonstrating the onset of rapid combustion.

The lignin prepolymer may also be characterized by its thermal stability. As described in the Example, below, thermogravimetric analysis (TGA) may be carried out to analyze the thermal stability of the lignin polymer. Using TGA analysis, the temperature at which about 100% mass loss occurs may be determined. This temperature may be greater than 650° C., greater than 700° C., greater than 750° C., greater than 800° C., or greater than 850° C. for the lignin prepolymer. This includes a temperature in a range of from 650° C. to 850° C. These temperatures also show that the lignin prepolymer comprises stronger bonds and thus, is more thermally stable, as compared to a starting lignin (e.g., FIG. 6 shows that the corresponding temperature for grass lignin is about 590° C.).

Uses of the lignin prepolymer are not particularly limited. In embodiments, however, the lignin prepolymer is used as a component to form a lignin resin. Thus, in another aspect, a method of forming a lignin resin is provided. In embodiments, such a method comprises adding monomers to a lignin prepolymer under conditions to induce polymerization reactions between the monomers and the lignin prepolymer. Any of the lignin prepolymers disclosed herein may be used. The polymerization may be carried out in the acidified ozonized reaction mixture, i.e., without recovering the lignin prepolymer therefrom, by simply adding the monomers to the acidified ozonized reaction mixture. (See FIG. 1B.) However, this is not necessary, as the lignin prepolymer may be independently generated, e.g., using different equipment, a different facility, etc. If the lignin prepolymer is independently generated, it may be recovered and, if desired, dissolved/suspended in a solvent prior to carrying out the polymerization.

Figure 8:
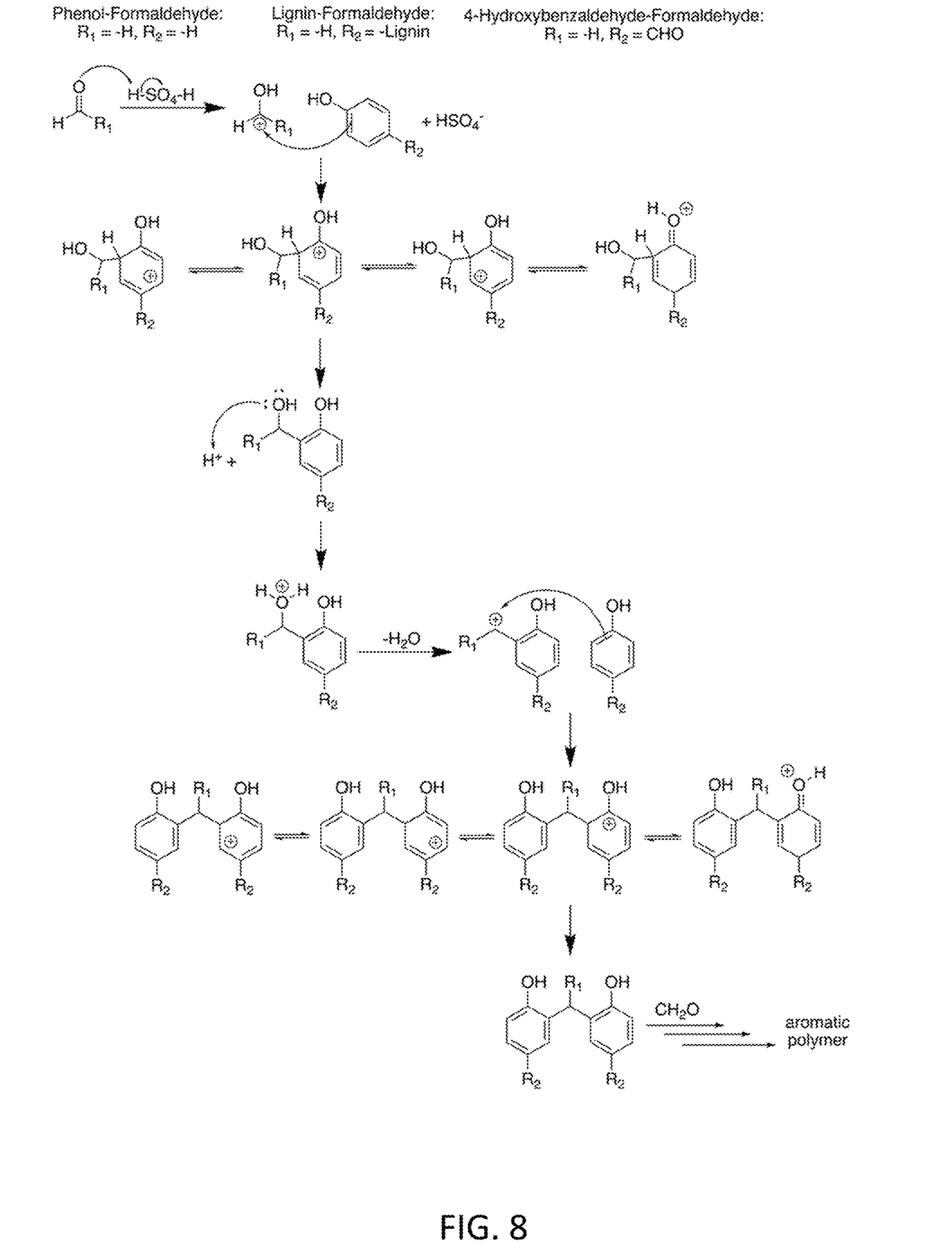
FIG. 8 is a schematic showing the formation of phenol-, lignin-, and 4-hydroxybenzaldehyde-formaldehyde resins via the electrophilic aromatic ortho-substitution of p-substituted aromatics. Note: phenol will preferentially undergo a para-substitution as well.

Selection of the monomers is guided by the desired properties for the lignin resin. Illustrative monomers include formaldehyde, hydroxymethylfurfural, and aromatic aldehydes such as difunctional phenol, 4-hydroxybenzaldehyde, and vanillin derivatives. Combinations of different types of monomers may be used. The step-growth polymerization reactions between a lignin prepolymer and formaldehyde to form a lignin resin (aromatic polymer) are shown in FIG. 8 (when $R_2$=lignin).

The conditions to induce the polymerization reactions depend upon the polymerization mechanism and the selected monomer(s). However, using formaldehyde as an example, the conditions may involve ambient conditions (described above) and a time in a range of from 10 minutes to 60 minutes. If polymerization is carried out in the acidified ozonized reaction mixture, it may not be necessary to add any catalyst (e.g., acid). The relative amounts of the lignin prepolymer and the monomer(s) may be adjusted depending upon the desired properties for the lignin resin.

The lignin resins formed as described herein may also be characterized by various properties, including polydispersity and thermally stability. The PDI values are generally higher for the lignin resin as compared to the lignin prepolymer due to the linking of the lignin prepolymers, e.g., 1.90 or greater. The lignin resins may have even greater thermal stability as compared to the lignin prepolymers. The temperature at which 100% mass loss occurs may be greater than 800° C., greater than 850° C., greater than 900° C., greater than 950° C., or greater than 1000° C. for the lignin prepolymer. This includes a temperature in a range of from 800° C. to 1500° C.

After the lignin resin has been formed, it may be recovered. Various techniques may be used, including dilution and precipitation as described in the Example, below. Uses of the lignin resin are not particularly limited.

As noted above, various types of starting lignins may be used in any of the methods disclosed herein, including corn cob lignin (i.e., a starting lignin extracted from corn cobs). Another feature of the present disclosure relates to the unexpected finding that the ozonolysis of corn cob lignin provides a substantially greater amount of cleaved aromatic monomers as compared to ozonolysis of corn stover lignin (i.e., a starting lignin extracted from corn stover). This is demonstrated in Example 2, below (see also FIG. 9). Thus, the present disclosure encompasses methods for the ozonolysis of corn cob lignin. In embodiments, such a method comprises flowing a lignin composition comprising corn cob lignin and a solvent through a reaction chamber, and flowing ozone through the reaction chamber. Illustrative details for such a method have been described above. This method forms an ozonized reaction mixture comprising ozonized corn cob lignin and aromatic monomers cleaved from the corn cob lignin. In embodiments, the cleaved aromatic monomers comprise vanillin and 4-hydroxybenzaldehyde. In embodiments, the amount of the cleaved aromatic monomers in the ozonized reaction mixture is at least twice as great as compared to that obtained from the same method but using corn stover lignin. The cleaved aromatic monomers have value on their own, e.g., as flavoring agents. However, cleaved aromatic monomers may also be used to form lignin prepolymers as well as lignin resins as described herein. Thus, the present disclosure also encompasses any of the disclosed methods of forming a lignin prepolymer in which the ozonized lignin, the cleaved aromatic monomers, or both, are derived from a starting lignin extracted from corn cobs. Also encompassed are any of the disclosed methods of forming a lignin resin using the resulting lignin prepolymer.

The present disclosure also encompasses the lignin prepolymer and the lignin resins formed according to the methods described herein.

EXAMPLES

In these Examples, the phrases "ozonized lignin" and "ozonized lignin solution" may be used analogously to the "ozonized reaction mixture" described above; similarly, "LLP" is analogous to the "lignin prepolymer" described above. The phrase "acidified lignin" refers to lignin which has been acidified without being ozonized.

Example 1

Introduction

This Example shows that the aldehydes produced from ozonolysis of acetosolv lignin (FIG. 1A) may be used as endogenous reagents for performing phenolation of lignin using an acid catalyst. Fast ozonolysis at ambient conditions yields low molecular weight aromatic species, including 4-hydroxybenzaldehyde (4HB) and vanillin with a molecular weight distribution in the 150-70,000 Da range. (See International Patent Publication No. WO2018013796, which is hereby incorporated by reference in its entirety.) The cumulative yield of 4HB and vanillin is approximately 6 wt. %. Following the scheme shown in FIG. 1A, the ozonolysis of acetosolv grass lignin and subsequent acidification of the ozonized lignin solution to make the lignin prepolymer can be performed in one pot. FIG. 1B shows the work-up of the ozonized lignin mixture used to investigate how the various components of lignin are rearranged to form a reactive prepolymer material. The ozonized lignin (OZL) isolated by evaporating the solvent consists of two fractions of nearly equal mass (1): a low molecular weight fraction soluble in ethyl acetate containing endogenous aromatic monomers along with phenolic oligomers (LLE), and a high molecular weight (HMW) fraction termed as lignin solids (HLS). How the LLE fraction can be grafted onto the HLS fraction to form entirely biobased lignin prepolymers (LPP) is demonstrated in this Example. The LPP may then be used to form resins that are similar to phenol-formaldehyde novolacs (LNR). The separation of the OZL into LLE and HLS fractions allows for the systematic investigation of the effects of using either LLE (endogenous aromatics) or other phenolation agents to graft the aromatics into the HLS fraction.

Materials

Glacial acetic acid (99.5%), formic acid (88%), methanol (GC grade), ethyl acetate, and ethanol (HPLC grade), along with concentrated sulfuric acid and acetone (ACS reagent grade), were purchased from TCI America. Dry acetosolv grass lignin was provided by Archer Daniels Midland (ADM) company. 4-hydroxybenzaldehyde and formaldehyde (37 wt. % in water) used for grafting and polymer syntheses were purchased from TCI America and used without further purification.

Methods

Grafting Endogenous Aromatic Monomers onto Ozonized Lignin to Form LPP

The ozonolysis and fractionation of low and high molecular weight fractions was carried out as described in International Patent Publication No. WO2018013796, which is hereby incorporated by reference in its entirety. (See also, Silverman, J. R. et al., *Reaction Chemistry & Engineering* 2019, 4, 1421-1430.) After ozonation, 50 mL of the reaction mixture containing roughly 0.500 grams solute of dissolved low and high molecular weight fractions (LLE and HLS) was acidified with a dropwise addition of 3 mL concentrated (18 M) sulfuric acid. The solution was stirred for 30 minutes before being diluted with 250 mL of a 9:1 v:v acetone:water mixture, which was stirred for 10 minutes. This was added to a 1.2 L sulfuric acid solution at pH 1 prepared with distilled water. This mixture was stirred until uniform, and the solid product was allowed to settle for 12 hours. The supernatant was drained and 1.2 L deionized (DI) water was added, and the product was again allowed to settle for 12 hours. This dilution was performed twice, or until the solution had a pH >5, at which point the supernatant was drained off and the product was dried for analysis.

Grafting Exogenous Aromatics onto Ozonized Lignin to Form LPP

In instances where the LLE and HLS were separated via solvent extraction, each fraction was dried via rotary evaporation and weighed before being dissolved again in acetic acid to afford 1 wt. % solutions. In instances where 4HB or phenol was used as a substitute for the LMW (LLE) fraction, a 0.05 wt. % solution of either 4HB or phenol was made in glacial acetic acid before adding the HLS and catalyst (sulfuric acid) and the aforementioned procedure was followed to form and isolate the LPP.

Grafted-Lignin-Formaldehyde Resin Synthesis (LNR)

After the 50 mL ozonized lignin solution was acidified for 30 minutes as detailed above, 1.25 mL of 37.0 wt. % formaldehyde solution was added dropwise. The solution was stirred for 30 minutes before being diluted in 1.2 L DI water and allowed to settle. The water was decanted and the resin was rinsed with DI water until the solution reached >5 pH, at which point the solid product was filtered off and dried to afford a brittle brown cake.

Analytical Methods

Gas Chromatography

The starting materials, recovered products, and extracted supernatant solutions were analyzed by gas chromatography with flame-ionization detection (GC-FID) by diluting 300 µL of solution filtered through a 0.42 micron filter with 1 mL of methanol. Purchased vanillin and 4-hydroxybenzaldehyde were used as standards for the chromatographic analysis. The GC method used an HP-INNOWAX column on an Agilent 7890A GC and used a carrier gas (He) flow of 1 std. $cm^3$/min, an inlet temperature of 250° C., and an injection volume of 1 µL. The oven temperature was initially held at 40° C. for 5 min, then ramped at 10° C. per minute to 220° C. and held at this temperature for a further 20 min. Quantification was performed using GC-FID, and calibration curves were prepared from known samples (from 0.01-5.0 wt. % solutions) employing previously reported methods. (Barrera, I. et al., *Chemical Engineering Research and Design* 2016, 107, 91-101.) Gas chromatograms had the baseline subtracted and area collected (at −24.4 and −31.0 minutes for aldehydes:vanillin and 4HB respectively) in Plot2, before comparing signal to a calibration curve.

Gel Permeation Chromatography

For GPC analysis, the solvent was evaporated from samples and replaced with dimethylformamide (1.0 mL). For prepolymer and resinous samples, the solutions were filtered through cotton to remove visible precipitates. GPC was performed on an Agilent 1260 Infiniti GPC system fitted with an Agilent refractive index detector. Two columns, a 300 mm Polargel-M followed by a 300 mm Polargel-L, were used in series at 40° C. The samples were eluted with dimethylformamide at a flow rate of 1.0 mL/min. Poly (methyl methacrylate) standards were used for calibration. Gel permeation chromatograms were calibrated against a polymethylmethacrylate standard before analysis in Plot2 for peak locations.

$^1$H-$^{13}$C Heteronuclear single quantum coherence (HSQC) Nuclear Magnetic Resonance Spectroscopy NMR spectra were recorded using a Bruker AVIII 500 MHz spectrometer with a multinuclear BFFO cryoprobe. Approximately 75 mg of lignin, ozonized lignin product, or lignin prepolymer was dissolved in 0.75 mL dimethylsulfoxide-$d_6$. Solids were filtered out with cotton, and the clear colored solutions were sampled. For the $^{13}$C NMR analysis, a power-gated decoupling sequence was used to screen out the Nuclear Overhauser Effect (NOE) with the following parameters: 150 ms relaxation delay, 64 K data points, and 1024 scans. 2D $^1$H-$^{13}$C HSQC NMR spectra were obtained using the hsqcedetgpsisp2.2 HSQC program. The central solvent peak was used as an internal chemical shift reference point (δC/δH 39.5/2.49). The spectral widths were 20 ppm and 234 ppm for $^1$H and $^{13}$C dimensions, respectively, along with the following parameters: 2 second relaxation delay, 8 scans, and 256 time increments were recorded in the $^{13}$C dimension. NMR spectra (.fid/.ser files) were analyzed in MestreNova.

Scanning Electron Microscopy

Lignins, ozonized fractions, and reaction products were dissolved in acetic acid (1 wt. %) and directly placed on the head of an SEM pin. These samples were allowed to dry before being sputter coated with 5 nm of gold before being imaged with a FEI Versa 3D Dual Beam machine, at a voltage of 5 kV and a spot size of 4.5 nm.

Thermogravimetric Analysis

Lignin, ozonized lignin, and lignin prepolymer samples were dried and weighed using a TA Instruments SDT-Q600 analyzer. Using flowing air and a ramp rate of 10° C./min from 35 to 1000° C., the change in mass was recorded. During analysis, the first derivative of the change in mass with respect to temperature was taken and graphed. Raw data were converted from absolute mass to change in mass percent to more easily compare different samples.

Results and Discussion

Ozonized Lignin Mixtures Condense into Prepolymer Materials.

Figure 2:
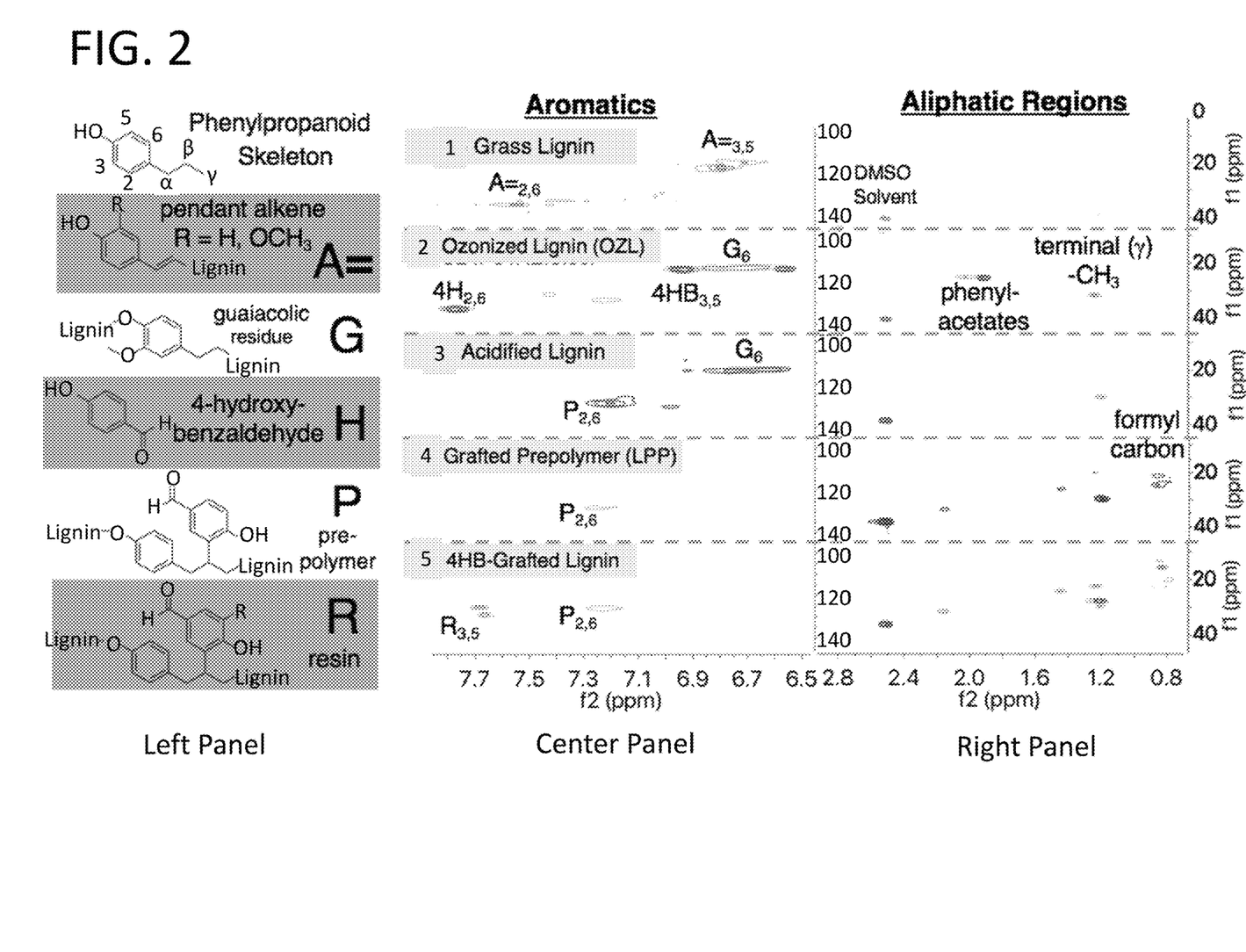
FIG. 2 shows the aromatic (center panel) and aliphatic regions (right panel) from 2D-HSQC NMR of grass lignin (1) and various products including ozonized lignin (2), acidified lignin (3), grafted prepolymer (LLP) (4), and 4-hydroxybenzaldehyde-grafted (4HB-grafted) lignin (5) along with relevant structures (left panel).
Figure 3:
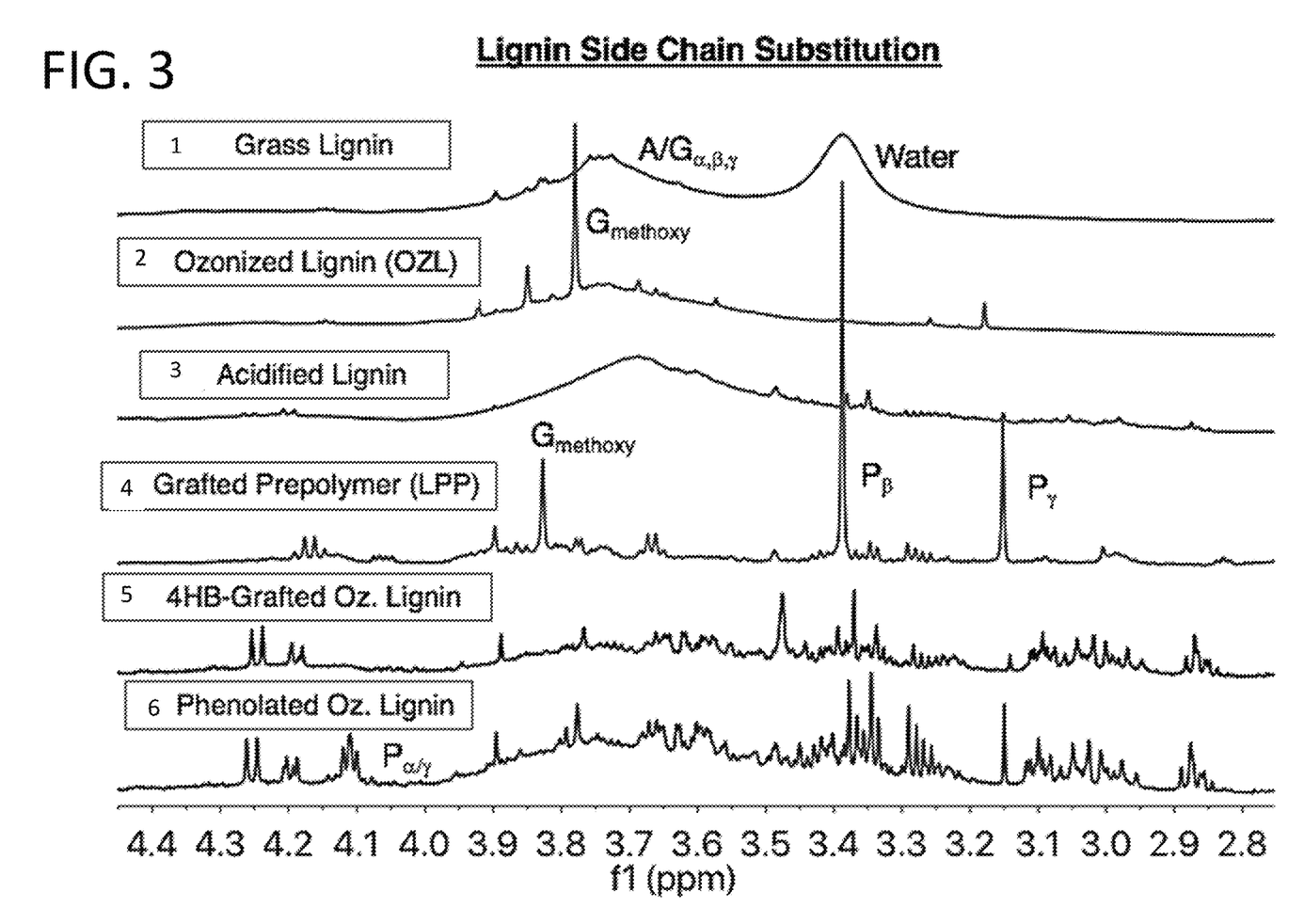
FIG. 3, traces (1)-(6), shows variation in $^1$H NMR of grass lignin following various treatments highlighting the substituted aliphatic side chains following grafting of endogenous aromatics in ozonized reaction mixture onto the lignin. The structures denoted by A, G, and P correspond to peaks from structures detailed in FIG. 2, left and center panels.

Two-dimensional $^1$H/$^{13}$C-HSQC and component one-dimensional $^1$H NMR spectra revealed changes from alkene rich grass lignin to aldehyde rich products after ozonolysis (FIG. 2, left, center, and right panels, and FIG. 3, traces (1)-(6), respectively). Acidification of the OZL solution with sulfuric acid revealed an altered lignin structure with aromatics grafted onto the propyl side chain as evident from changes between 2.9 to 4.3 ppm in the $^1$H NMR spectra (FIG. 3, traces (1)-(4)). Acidification of HLS fraction in the presence of either LLE (FIG. 3, trace (4)) or purchased 4HB (FIG. 3, trace (5)) resulted in an increase in the number and intensity of peaks indicative of substitution. New peaks in the acidified samples (FIG. 2, center panel, regions (3)-(5)) around 3.0 ppm correspond to β-substituted propyl chains, while peaks around 4.2 ppm may be either α- or γ-substitutions based on comparison with lignin model compounds. This suggests indiscriminate reactivity of the aromatic compounds in the LLE fraction that contained both 4HB and vanillin as products.

The proposed mechanism for the grafting of endogenous aromatics onto ozonized lignin progressed via a carbocation intermediate where the most stable conformation (α, β, or γ) will depend on the ring and propyl-chain substitutions (FIG. 4). After the initial substitution and grafting of the LLE aromatics, the macromolecular lignin possessed additional terminal phenolic rings, which may react with monomers downstream to afford di-substituted aromatics. (See FIG. 8.)

The LPP that resulted from acidification of the OZL solution exhibited mono- and di-ortho-substituted phenolics. Interestingly, more di-substituted aldehydes were evident during acidification of the HLS fraction with 4HB (FIG. 3, trace (5)) rather than the LPP fraction (FIG. 3, trace (4)), indicating that the exogenous single aromatics alone may not necessarily increase the number of reactive sites, as the second ortho-position on these aromatics may also be substituted. (See FIG. 8.) Signals in the aliphatic region (FIG. 2, right panel) revealed the acetylation of products with evidence of protected phenolic (—OH) groups.

Figure 5:
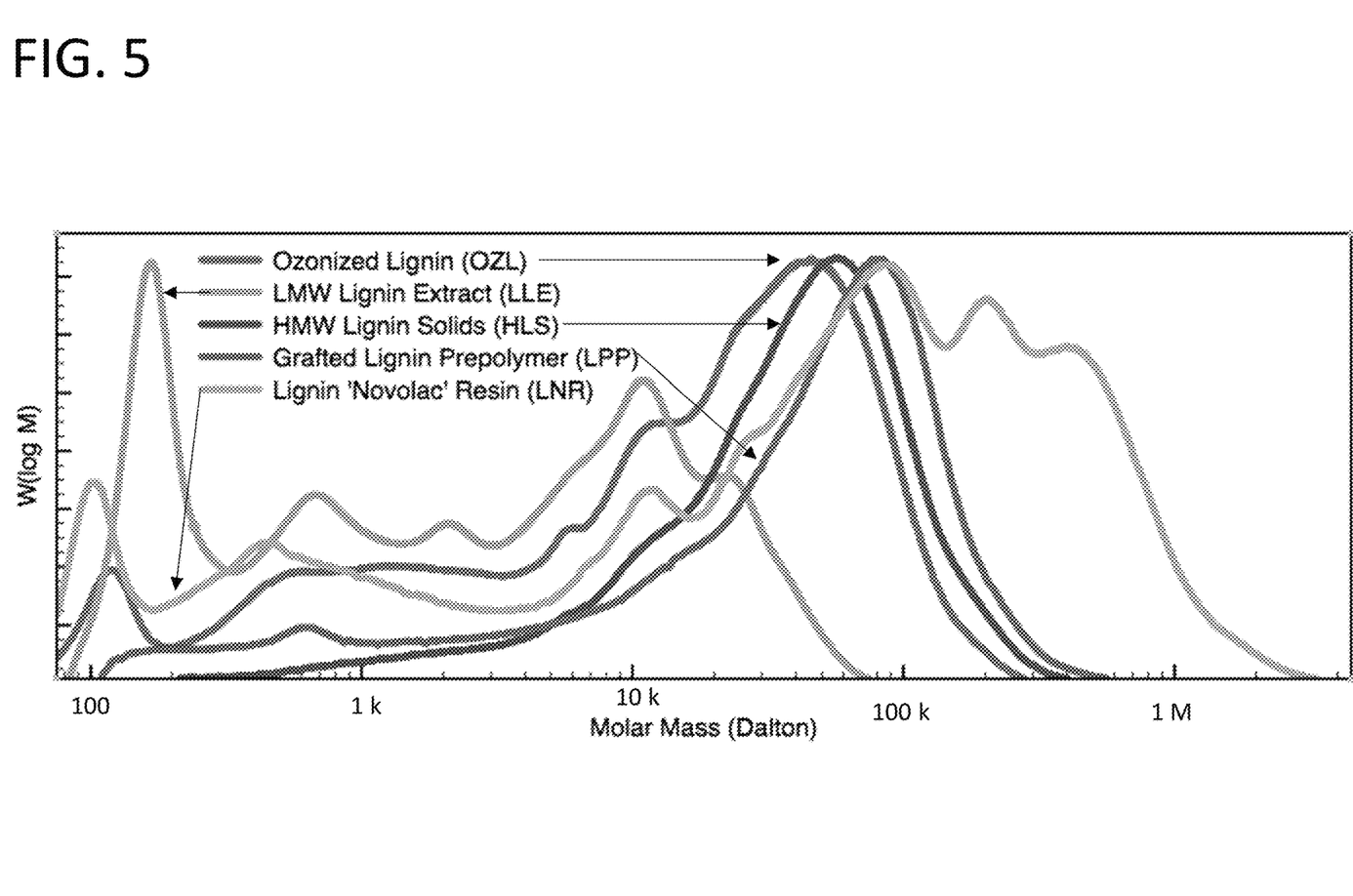
FIG. 5 shows GPC spectra of ozonized lignin (OZL), fractioned ozonolysis products (LLE and HLS), grafted prepolymer (LPP), and resin (LNR). The corresponding molecular weights and polydispersities are provided in Table 1, below.

Structural characterization of the grass lignin and products with GPC shows an increase in the molecular weight distribution of the grafted LPP following acidification of the OZL solution (FIG. 5 and Table 1). The LPP had a number and weight average molecular weight nearly twice that of the isolated HLS fraction. While the phenolation of the organosolv lignin mixture has been demonstrated to decrease the average molecular weight of product species, the OZL mixture showed an increase upon grafting. (Podschun, J. et al., European Polymer Journal 2015, 67, 1-11; and Funaoka, M. et al., Biotechnology and Bioengineering 1995, 46 (6), 545-552.) This suggests that most of the lignin depolymerization occurred during the ozonolysis step rather than the grafting step. While the polydispersity of the LPP product (1.88) was nearly identical to the HLS fraction (1.84), it was significantly less than that of either the input organosolv lignin mixture (2.46) or the LLE fraction (2.68). This suggests that the acid catalyzed condensation of the ozonized lignin mixture mainly grafted the aromatic species from the LLE fraction onto the HLS fraction, thereby narrowing the size distribution of aromatic species in the grass lignins. In contrast, the number and weight average molecular weights of the novolac-type resin (LNR), made from the reaction between the LPP and a molar excess of formaldehyde, were nearly two and over three times greater than the LPP, respectively, indicating that the LPP macromolecules were linked via polymerization of the reactive aromatic sites.

TABLE 1

Molecular weights and polydispersities of ozonized lignin (OZL), fractioned ozonolysis products (LLE and HLS), grafted prepolymer (LPP), and resin (LNR).

| Lignins and Products | Number Average Molecular Weight (Mn) | Weight Average Molecular Weight (Mw) | Poly-dispersity Index (PDI) |
|---|---|---|---|
| Ozonized Lignin (OZL) | 29,800 | 69,000 | 2.31 |
| LMW Lignin Extract (LLE) | 8,270 | 22,200 | 2.68 |
| HMW Lignin Solids (HLS) | 49,900 | 93,700 | 1.88 |
| Grafted Prepolymer (LPP) | 98,400 | 181,000 | 1.84 |
| Lignin 'Novolac' Resin (LNR) | 182,000 | 640,000 | 3.52 |

GPC spectra of the LPP are similar to those for phenolated HLS fraction and HLS grafted with 4HB (data not shown). GPC analysis of the filtrate following acidification of the OZL mixture and precipitation of the LPP shows a virtual absence of the LLE and HLS fractions in the filtrate (data not shown). Further, GC-FID analysis of the filtrate shows a significant decrease in the major phenolic compounds in the LLE fraction after precipitating LPP. These results provide compelling evidence that nearly all of the LLE fraction was grafted onto the HLS fraction and that all of the valuable phenolic compounds in the ozonized lignin were used in the prepolymer synthesis, eliminating waste. The condensation of vanillin with formaldehyde has been previously reported. (Podschun, J. et al., ACS Sustain. Chem. Eng. 2015, 3, 2526-2532; Funaoka, M. et al., Biotechnology and Bioengineering 1995, 46 (6), 545-552; and Amarasekara, A. S. et al., Journal of Applied Polymer Science 2019, 136 (4), 47000.) To confirm that the endogenous 4HB present in the LLE is also reactive with formaldehyde and capable of forming polyaromatic species, commercially purchased 4HB and formaldehyde mixtures were acidified to make oligomers (data not shown).

Materials Characterization of Lignin Prepolymer and Resin Products

The yield was determined as the ratio of the mass of the dry isolated LNR solid product to the sum of input LPP and formaldehyde reagents (equation 1). The average yield was 57% for LNR derived from grass lignins (FIG. 1B). This is in agreement with yields of other acid and base-catalyzed phenol-formaldehyde resins and comparable to lignin substituted phenolic resins affording yields between 48-65%. (Phillip Cook, S. L. H. U.S. Pat. No. 5,010,156A, 1990; Michel Delmas, B. B. M. U.S. Pat. No. 10,160,823B2, 2018; Richard T. Hood, R. L. B. EP0200479A2, 1986; and Zhang, W. et al., *International Journal of Adhesion and Adhesives* 2013, 40, 11-18.)

$$\frac{\text{mass}_{LNR}}{\text{mass}_{LPP} + \text{mass}_{formaldehyde}} * 100\% = \text{Yield (\%)} \quad (1)$$

Thermogravimetric analysis (TGA) of the reagents and products indicates the complete combustion of grass lignin and OZL in air at <600° C. while the LPP and LNR products resisted total combustion in air even at temperatures far exceeding 600° C. and beyond 800° C., respectively (FIG. 6). The LNR retained nearly 50 wt. % of its mass at temperatures beyond the complete degradation of input lignins (600° C.), indicating the impact of carbon-carbon bond formation in the prepolymer and resin products that retards combustion far better than the weaker bonds in the original lignin.

Figure 7:
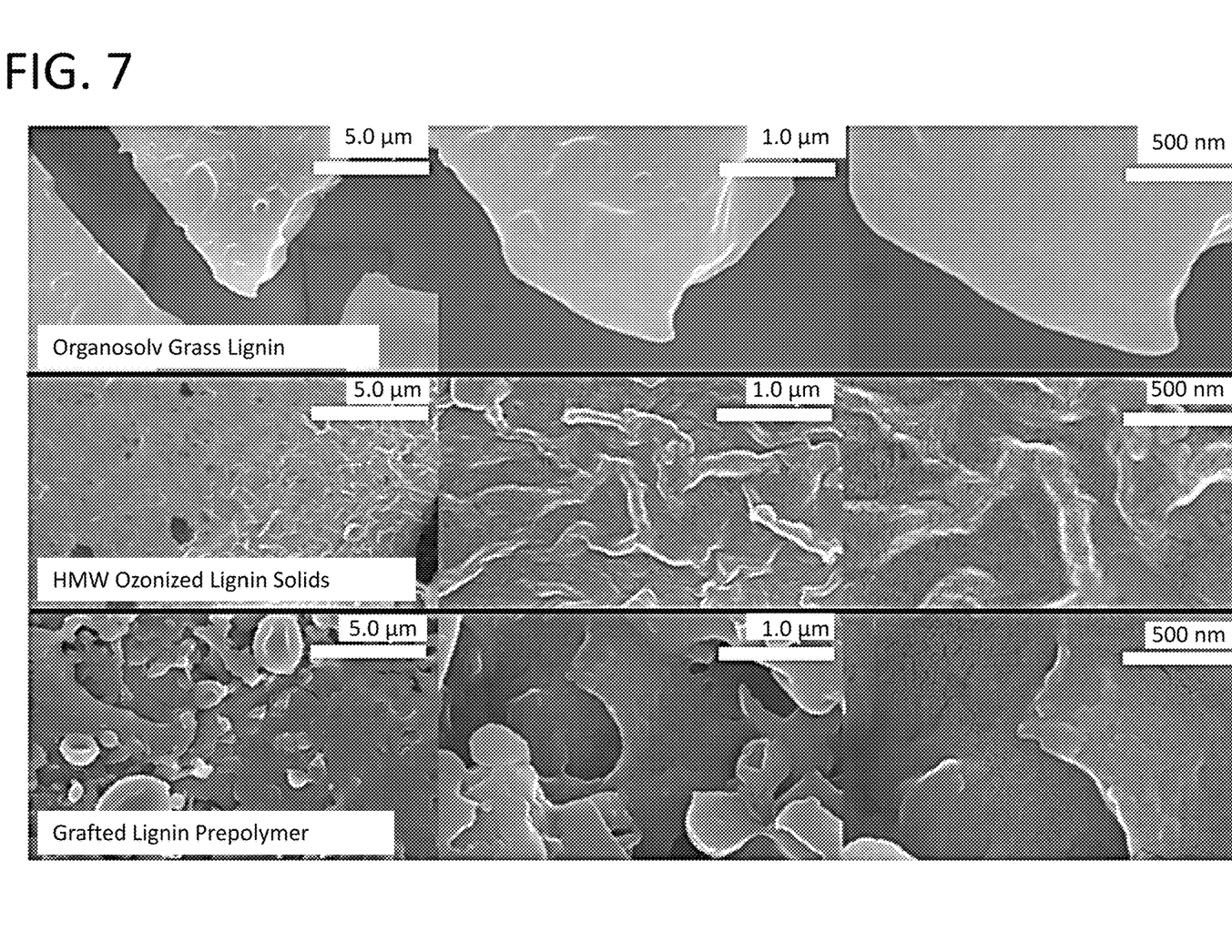
FIG. 7 shows Scanning Electron Micrographs of unprocessed lignin (i.e., starting lignin) (top), HMW fraction (HLS) (middle), and the grafted prepolymer (LPP) (bottom) demonstrating the transformation from a smooth homogenous material into a rough and varied material for downstream polymerization.

Scanning electron microscopy images of the unprocessed lignin, HLS fraction of the ozonized lignin, and the LPP product reveal distinct changes in morphology upon rearrangement of the parent grass lignin upon ozonolysis and acidification (FIG. 7). The relatively smooth features observed in the unprocessed lignin contrast with the roughness and cracks seen in the HLS fraction of ozonized lignin, suggestive of exposed macromolecular lignin components that lend themselves to grafting aromatics onto lignin's propyl side chains. The grafted LPP shows micron-scale features of various shapes and sizes with high surface area compared to the smooth surface of the unprocessed lignin. Such an altered assembly of lignin macromolecules in the grafted LPP not only changes material properties such as combustion and wettability of the original lignin but makes them more amenable for downstream processing. For example, the reactive sites in the exposed LPP fragments lend themselves easier to downstream polymerization.

Even though lignin derived novolac resins from the reaction between grafted LPPs and formaldehyde serve to displace phenol-derived polymers, it is preferable to also replace the hazardous formaldehyde monomer with a greener alternative, such as biobased hydroxymethylfurfural, modified aromatic aldehydes, or species generated in situ from lignin depolymerization. The technique described in this Example may also be expanded to process lignins from woody biomass which has fewer pendant aromatics than grass lignins, or combine low molecular weight fractions from ozonized grass lignins with woody lignins. Circumventing the need for exogenous aromatics in lignin valorization serves to leverage lignin's natural aromatics in a biomimetic manner, replacing weaker bonds more susceptible to oxidation with stronger carbon-carbon bonds more resistant to oxidation and suitable for use in technical grade polymers and consumer products.

Conclusion

The foregoing results clearly demonstrate that endogenous aromatics including aldehydes found in low molecular weight extracts of ozonized grass lignins may be grafted onto ozonized lignin to afford prepolymer products with high molecular weight distributions and low polydispersities evident from NMR, GC, and GPC studies. When using endogenous source of aromatics, nearly all of the input lignin is used to form the prepolymers, eliminating the need for external sources of aromatic reagents such as phenol. The lignin-based prepolymers may be used as components of Novolac-type resins, formed by treating the prepolymers with formaldehyde. TGA studies indicate that both the grafted prepolymers as well as the Novolac-type resins decompose in air at higher temperatures than lignins, indicating that these products may be useful additives for commercial polymers. SEM reveals the transformation of lignins from smooth materials into rough micron-sized structures, revealing how a relatively simple two-step ozonolysis-acidification pretreatment step can transform waste grass lignins from cellulosic ethanol biorefineries into valuable material precursors.

Example 2

Figure 9:
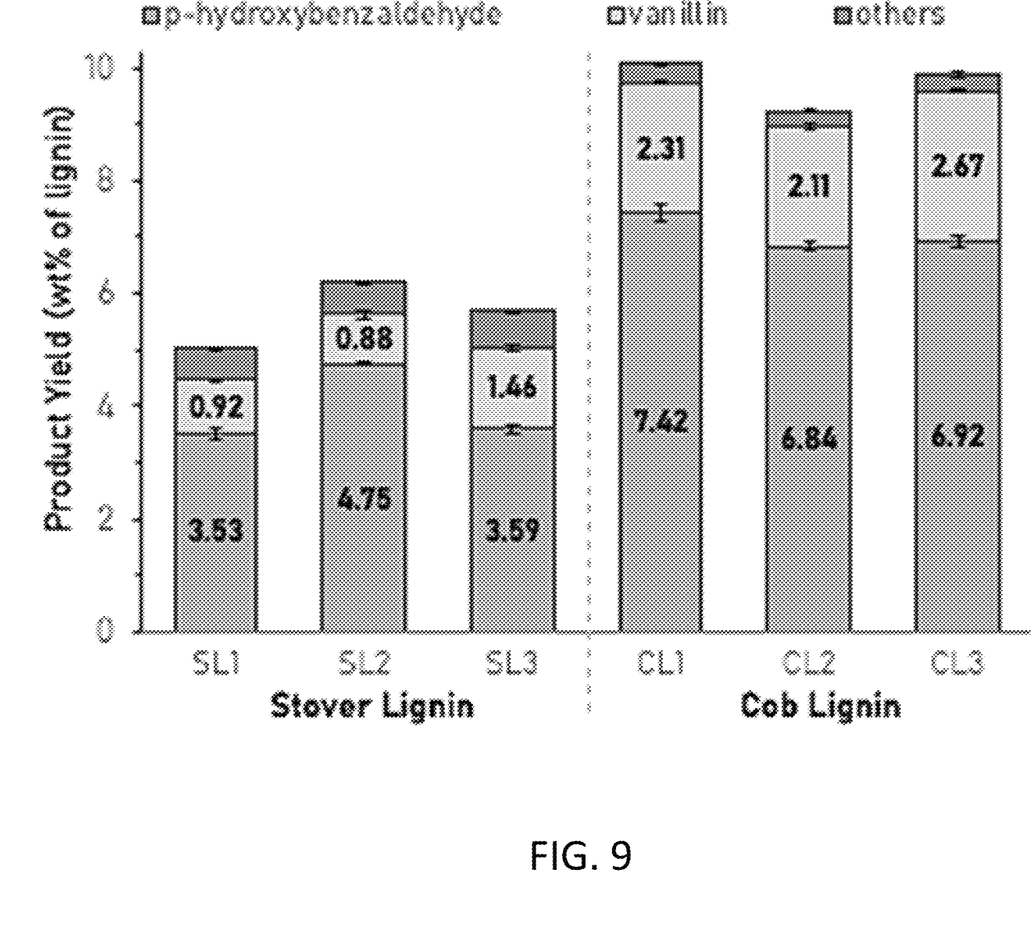
FIG. 9 shows the yield of cleaved aromatic monomers from the ozonolysis of corn stover lignin as compared to the ozonolysis of corn cob lignin.

Additional experiments were conducted to demonstrate that the ozonolysis concept described herein works with lignin extracted from just corn cobs, yielding twice the amount of the flavoring agents (vanillin and p-hydroxybenzaldehyde) as compared to corn stover lignin. The results are shown in FIG. 9. The increased yield correlates with the increased amounts of the ferulates and coumarates present in the corn cobs compared to the corn stover lignin. However, the correlation between the amounts of ferulates and coumarates in the lignins and amounts of flavoring agents (vanillin and p-hydroxybenzaldehyde) produced has not been previously known and is an important discovery.

In addition to their significant market values as flavoring agents, vanillin and p-hydroxybenzaldehyde can also be used as substitutes for petroleum-derived phenol to make renewable materials as disclosed herein. By simply adding sulfuric acid to the ozonized lignin solution, the aromatic aldehydes can be grafted onto the remaining lignin to create a prepolymer. Novolac-type resins can be produced by treating this prepolymer with formaldehyde. The discovery that corn cobs yield twice the amounts of vanillin and p-hydroxybenzaldehyde means that beyond meeting their demand as flavoring agents, they can also be used as phenol substitutes to make resins and building materials.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the invention to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method of forming a lignin prepolymer, the method comprising:
   adding an acid to an ozonized reaction mixture, the ozonized reaction mixture comprising ozonized lignin having a backbone, and aromatic monomers cleaved from a lignin, under conditions to react the cleaved aromatic monomers with the backbone of the ozonized lignin to form a lignin prepolymer.

2. The method of claim 1, wherein the ozonized lignin and the cleaved aromatic monomers are derived from the same starting lignin.

3. The method of claim 2, wherein the starting lignin is extracted from herbaceous biomass.

4. The method of claim 3, wherein the herbaceous biomass is corn cobs.

5. The method of claim 1, wherein the ozonized lignin and the cleaved aromatic monomers are derived from different starting lignins.

6. The method of claim 5, wherein the ozonized lignin is derived from a starting lignin extracted from woody biomass and the cleaved aromatic monomers are derived from a starting lignin extracted from herbaceous biomass.

7. The method of claim 1, wherein the ozonized lignin is derived from a starting lignin extracted from herbaceous biomass and another starting lignin extracted from woody biomass.

8. The method of claim 1, wherein the lignin prepolymer does not comprise any grafted exogenous aromatic monomers.

9. The method of claim 1, wherein the acid is a strong acid.

10. The method of claim 1, wherein the step of adding the acid is carried out under ambient conditions.

11. The method of claim 1, wherein the cleaved aromatic monomers comprise one or more of vanillin, 4-hydroxybenzaldehyde, hydroquinone, vanillic acid, and 4-hydroxybenzoic acid.

12. The method of claim 1, wherein the ozonized reaction mixture is formed by flowing a lignin composition comprising a starting lignin and a solvent through a reaction chamber and flowing ozone through the reaction chamber.

13. The method of claim 1, further comprising forming the ozonized reaction mixture prior to adding the acid.

14. The method of claim 13, wherein the ozonized reaction mixture and the lignin prepolymer are formed in the same reaction chamber.

15. The method of claim 1, wherein the lignin prepolymer is characterized by a polydispersity index of no more than 2.00; a temperature at which 100% mass loss occurs of greater than 700° C. as determined by thermogravimetric analysis; or both.

16. The method of claim 1, further comprising adding a monomer to the lignin prepolymer under conditions to induce polymerization reactions between the monomer and the lignin prepolymer to form a lignin resin.

17. The method of claim 16, wherein the monomer is formaldehyde, an aromatic aldehyde, hydroxymethylfurfural, or a combination thereof.

18. The method of claim 16, wherein the lignin prepolymer and the lignin resin are formed in the same reaction chamber.

19. The method of claim 16, further comprising forming the ozonized reaction mixture prior to adding the acid.

* * * * *